UNITED STATES PATENT OFFICE.

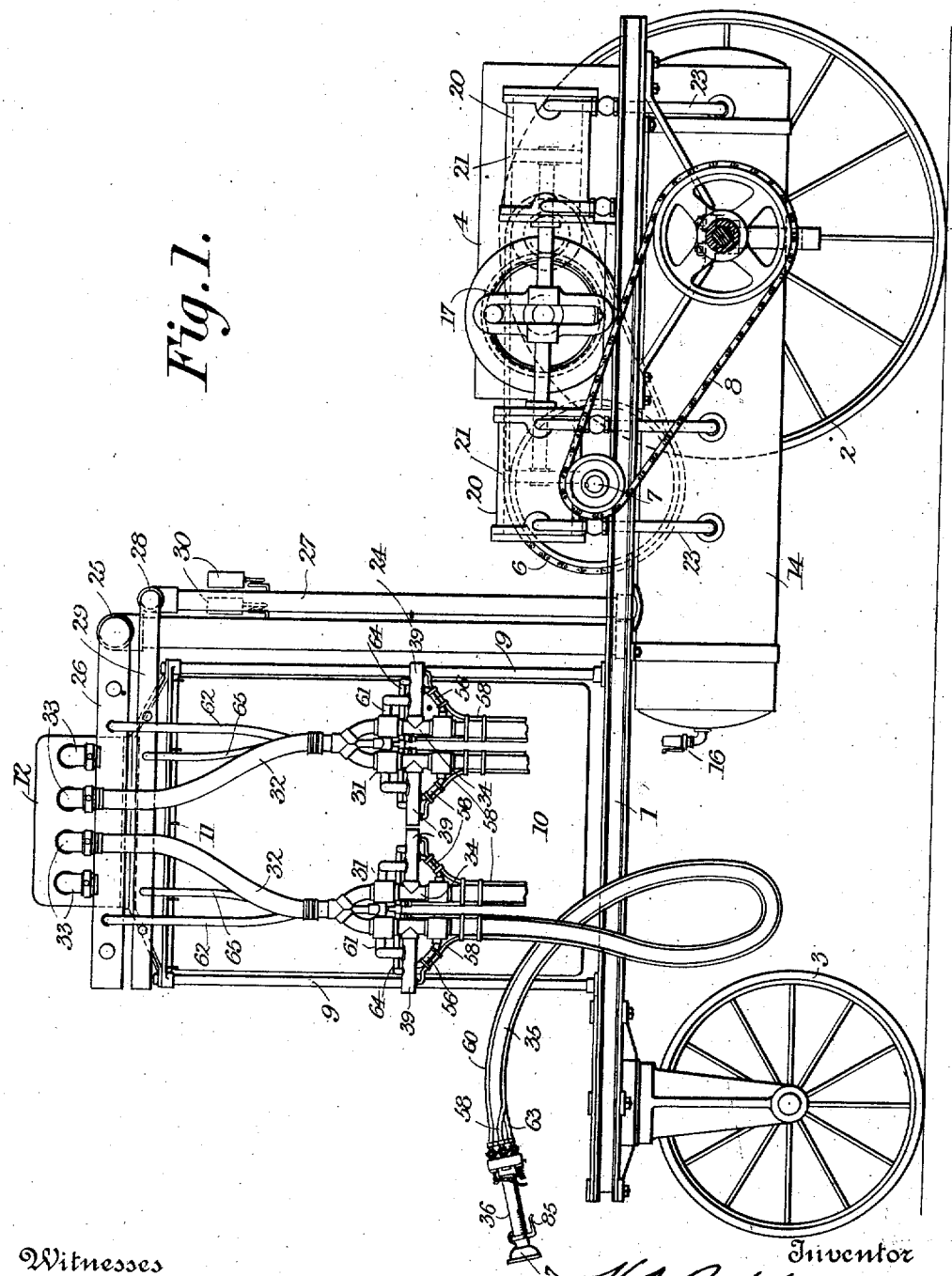

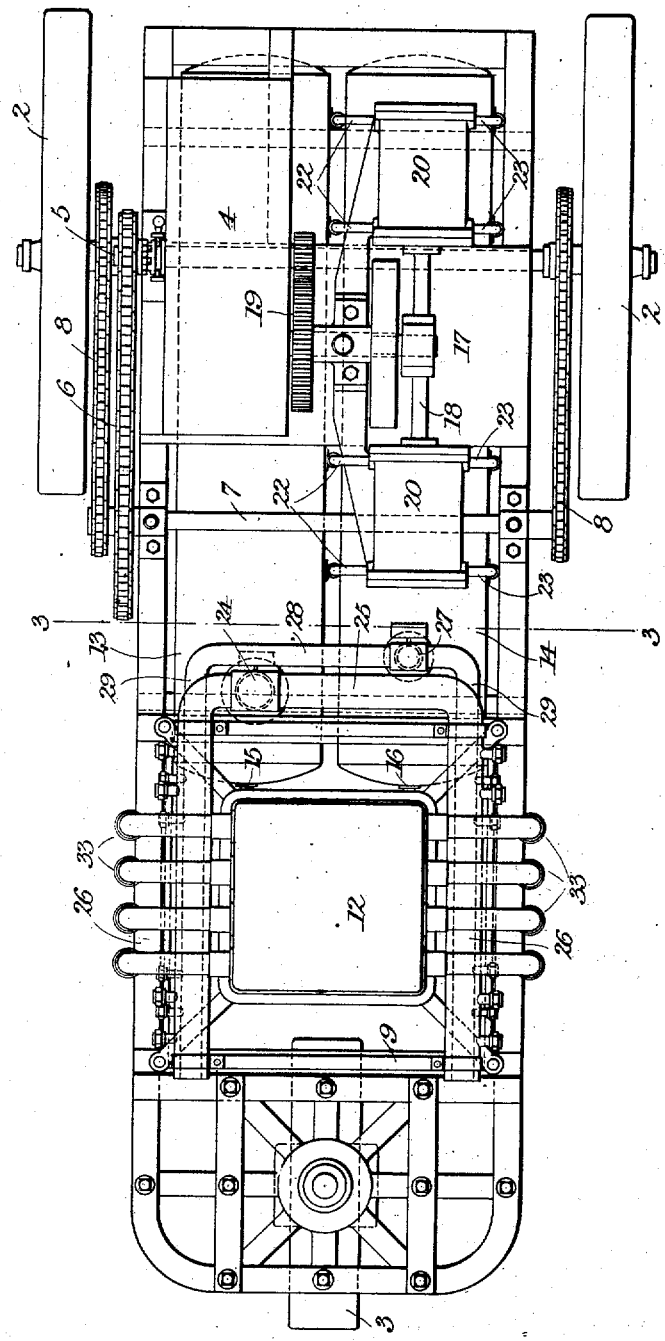

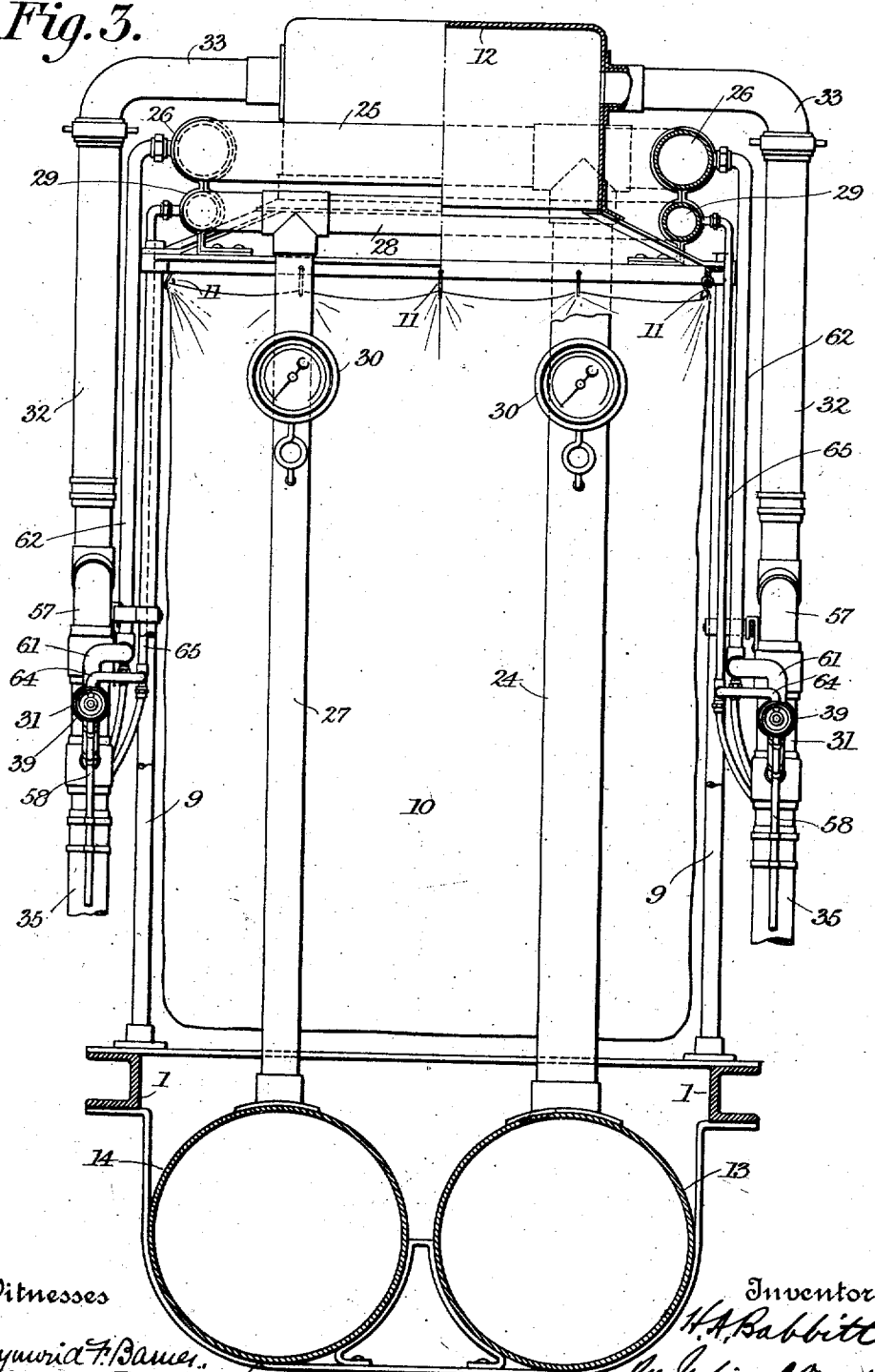

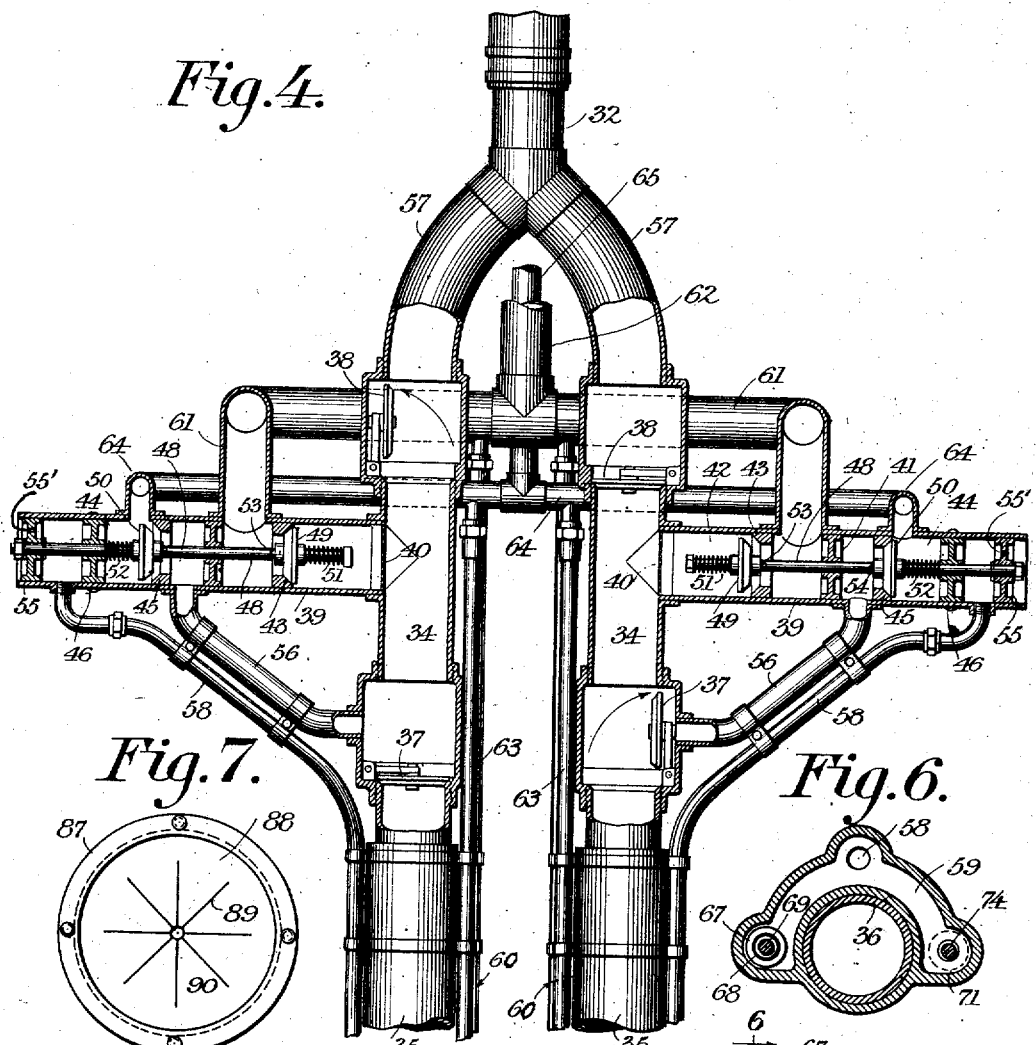

HARRY A. BABBITT, OF OKLAHOMA, OKLAHOMA.

COTTON-PICKER.

No. 887,178.

Specification of Letters Patent.

Patented May 12, 1908.

Application filed December 11, 1907. Serial No. 406,034.

*To all whom it may concern:*

Be it known that I, HARRY A. BABBITT, a citizen of the United States, residing at Oklahoma, in the county of Oklahoma and State of Oklahoma, have invented certain new and useful Improvements in Cotton-Pickers; and I do hereby declare the following to be a full, clear, and exact description of the invention, such as will enable others skilled in the art to which it appertains to make and use the same.

This invention relates to cotton harvesters of the type in which the cotton is drawn or gathered from the bolls or pods through suitable suction tubes and thereafter delivered, under the action of pneumatic or other fluid pressure, into a bag or receptacle.

The cotton harvester herein disclosed embodies in its general organization a wheeled main frame or vehicle having erected thereon a suitable rack or frame in which the sacks or other receptacles may be suspended, there being sustained on the main frame a vacuum tank and a fluid compression tank, together with a suitable motor-operated air or other fluid pump, operatively connected with said tanks, for exhausting fluid from the one and compressing it in the other. The harvesting mechanism also includes a separator having a chamber into which the cotton is received from the gathering tubes or ducts and with which the vacuum and compression tanks are operatively connected for controlling collection of the material in the separator and its discharge therefrom into a receiving dome arranged at the top of the rack or frame, for final deposit in the storage receptacle.

The invention has for its objects to provide a practicable and efficient device of this character through the medium of which the cotton may be rapidly gathered and stored in the sacks or other receptacles; one wherein the operation of drawing the cotton into the separator and discharging it therefrom into the receptacle will be under perfect and convenient control of the operator; and one which permits the cotton to be gathered simultaneously from the plants in a plurality of rows, during movement of the machine over the field.

A further object of the invention is to provide a simplified valve controlling mechanism, arranged for convenient operation by the attendant, and whereby the gathering tubes or ducts are thrown, first, instantaneously into communication with the vacuum tank, through the intermediary collecting or separating chamber, while the cotton is being taken from the bolls, and connection thereafter momentarily established between the compression tank and collecting or separating chamber for directing a current of fluid under pressure through the latter for forcing the material into the cotton dome to be finally deposited in the storage receptacle.

With these and other objects in view, the invention will hereinafter be described by reference to the accompanying drawings, which form a part of this specification, and then more particularly pointed out in the claims.

In the accompanying drawings: Figure 1 is a side elevation of a cotton harvesting machine embodying the invention. Fig. 2 is a top plan view of the same. Fig. 3 is an elevation, partly in section, of the harvesting mechanism, the section being taken on the line 3—3 of Fig. 2. Fig. 4 is a detail sectional view of the separator showing the manner of connecting the collecting chamber, embodied therein, respectively with the collecting tube and air controlling device. Fig. 5 is an enlarged detail view, partly in section, of one of the cotton gathering or picking nozzles showing the valve controlling mechanism carried thereby. Fig. 6 is a detail sectional view taken on the line 6—6 of Fig. 5. Fig. 7 is a detail front end view of the nozzle.

Referring to the drawings it will be seen that the machine embodies a main frame 1 sustained for travel on rear transporting wheels 2 and a front caster wheel 3, designed for guiding the vehicle in its movements over the ground, it being understood in this connection that the vehicle, which may be of the construction shown or other preferred construction, may be propelled in any appropriate manner, such as by means of a motor 4 carried by the frame and having its shaft 5 operatively connected, by means of a sprocket chain 6, with a driven shaft 7, in turn connected by sprocket chains 8 with the wheels 2 or with the axle on which said wheels are mounted.

Erected on the vehicle frame 1 is a vertical rack or frame 9 in which a sack or other storage receptacle 10 may be suspended in any appropriate manner, as by means of hooks 11 there being sustained on top of the frame 9, and over the mouth of the receptacle, a cotton receiving dome 12, the function of which will more fully hereinafter appear, while fixed on and preferably beneath the frame 1 is a vacuum tank or reservoir 13 and a compression tank or reservoir 14 provided respectively with relief valves 15 and 16.

Mounted on the rear portion of the frame above the tanks 13 and 14 is an air or other fluid pump 17 having its piston rod 18 connected by suitable gearing 19 with the motor shaft 5 and its cylinders 20 connected with the tanks 13 and 14, respectively, by means of pipes or ducts 22 and 23, whereby, during operation of the pump, under the action of the motor, the air or other fluid will be exhausted from the tank 13 and compressed in the tank 14, thus maintaining a vacuum in the first named tank and a supply of fluid under pressure within the last named tank.

Communicating at its lower end with, and arising vertically from the vacuum tank 13 is a vacuum tower 24, in the form of a pipe or duct, having at its upper end a horizontal substantially U-shaped tubular portion 25, the arms 26 of which project forwardly on opposite sides of the dome 12, while arising vertically from the compression tank 14 and communicating at its lower end therewith is a compression tower 27, in the form of a pipe or duct, provided at its upper end with a horizontal, substantially U-shaped tubular portion 28, the arms 29 of which project forwardly at opposite sides of the dome 12 and immediately beneath the arms 26, the towers 24 and 27 being equipped with suitable pressure gages 30.

Arranged on each side of the receptacle supporting frame 9, is a plurality of separators 31 having independent connection with the dome 12, for the purpose which will more fully hereinafter appear, by means of pipes or ducts 32 detachably coupled at their upper ends to the outer ends of horizontally projecting coupling tubes 33 with which the dome is provided, a number of said tubes 33 being disposed at each side of the dome thus permitting a greater or lesser number of the separators to be connected therewith as circumstances may require.

Inasmuch as the separators are identical in construction and operation a detailed description of one will suffice for all. Each separator is preferably of metal tubing, as shown more clearly in Fig. 4, and presents a pair of separator chambers or compartments 34 which receive the cotton from the main flexible gathering tubes or ducts 35, equipped at their free ends with the picker nozzles 36. There is arranged in each compartment 34 for normally closing its forward end an inlet valve 37 and for closing its rear end an outlet valve 38, while communicating with the compartment, at a point between its ends and preferably extending at right angles thereto, is a tubular valve chamber 39 having its inner end, which communicates with the separator chamber, covered by an open-work screen or shield 40. Each of the valve chambers 39 is divided by an intermediate partition 41 into an inner valve space or compartment 42 containing a valve seat 43, and an outer valve space or compartment 44 containing a valve seat 45, and is closed at a point outside of the seat 45 by an outer wall or partition 46. There is arranged for longitudinal movement in the chamber 39 a valve rod or stem 48 having bearing in suitable guides formed in the partitions 41 and 46 and carrying valves 49 and 50, designed to close respectively on the seats 43 and 45. It is noted in this connection, that the valves, which are arranged to seat from opposite directions, are movable to open position, independently of the rod 48, and against the action of springs 51 and 52, and are also positively movable with the rod to open position, under the action of stop pins 53 and 54 projecting transversely of the rod and disposed to engage at the inner faces of the valves. Fixed upon the rod 48 for movement within the space or compartment 44 is a valve operating piston 55, provided with a vent opening 55' and designed for positively moving the rod to alternately open the valves in the manner, and for the purpose, more fully hereinafter explained.

Communicating with each of the separator compartments 34 at a point near its forward or intake end, and immediately in rear of the valve 37 is a branch tube or duct 56 leading to and communicating with the valve chamber 39, at a point between the partition 41 and valve 50. Leading from the rear or discharge end of each compartment 34 and in rear of the valve 38, is a branch duct 57 communicating with, and forming in effect a part of, the duct 32.

Connected at its rear end with the valve chamber 39 and communicating with the compartment 44 thereof, at a point between the partition 46 and piston 55, is an air tube or duct 58, which extends along the main gathering duct 35, and communicates at its forward end with a valve chamber 59, formed or provided on the rear end of the nozzle 36. Communicating at its forward end with the chamber 59, is a vacuum tube or duct 60, leading along the main duct 35 and communicating at its rear end with a branch duct 61, having its opposite ends in open communication with the respective valve chambers 39, at a point between the adjacent partition 41 and valve 49, said branch being connected at a point between its ends, and by means of a flexible tube or duct 62, with one arm 26 of the vacuum tower 24. There is also connected for communication at its forward end with the valve chamber 59, a pressure tube or duct 63, leading along the main tube 35 and communicating at its rear end with a branch tube or duct 64, having its opposite ends in open communication, respectively, with the valve chambers 39, at a point between the valve 50 and partition 46, the said duct 64 being connected, between its ends, by means of a tube or duct 65 with one arm 29 of the compression tower 27.

Movably arranged in the valve casing 59, for closing the forward end of the duct 60, is a valve 66 normally pressed to its seat 67 by means of a spring 68 and having its stem 69 projected outward through the wall of the casing and provided with a terminal head or enlargement 70. There is also arranged in the casing 59 and for closing the forward end of the duct 63, a valve 71 normally pressed to its seat 72 by means of a spring 73 coiled upon the stem 74 which projects beyond the wall of the casing and has a terminal head or enlargement 75.

Pivoted on the nozzle 36, by means of a pin 76 engaging a slot 77, is a rocking member or lever 78 having one end forked for engagement with the stem 69, in rear of the head 70, and its other end disposed for contact with the headed end 75 of the valve stem 74. There is provided on the lever 78, which is susceptible of limited longitudinal movement or play against the action of a spring 78$^a$, a pin or stud 79 disposed to ride over a cam projection 80 provided on the nozzle 36, to affect such movement of the lever for the purpose presently explained. Pivoted at its rear end to the lever 78, is a rigid connecting rod 81 disposed to work between its ends in a guide 82 on the nozzle and having its forward end pivoted to a controlling lever 83, in turn fulcrumed at 84 on the nozzle and provided at its free end with a rearwardly extending angular grip portion 85 to be grasped for moving the lever against the action of a normally expanded spring 86, coiled on the rod 81, between the guide 82 and lever. The nozzle 36 is provided at its forward end with a bell-mouth 87, covered by a leather or other pliable shield 88, in which is formed a series of radial incisions 89 producing segmental tongues or flaps 90, which open sufficiently to permit passage of the cotton into the nozzle.

In practice, during operation of the pump 17, in the manner heretofore explained, air will be exhausted from the tank 13 and compressed in the tank 14 thereby creating a vacuum in the tank 13, tower 24, and arms 26 and in the tubes 60, 61 and 62 while at the same time air under pressure will be supplied from the tank 14 to the tower 27, arms 29, and tubes 63, 64 and 65. Under these conditions when the mouth of the nozzle 36 is applied to the pod or boll the lever 83 is pressed inward, thereby moving the rod 81 rearwardly for rocking the lever 78, whereby the valve 66 is opened, thus establishing communication between the tubes 58 and 60, through the valve chamber 59, whereupon, and owing to the tube 60 being in connection with the vacuum tower, suction will be created in the tube 58 and consequently in the compartment between partition 46 and piston 55 of the valve chamber 39, thereby acting on the piston 55 for moving the rod 48 inwardly to open the valve 49, as shown at the right in Fig. 4. As soon as said valve opens communication is established between the branch vacuum pipe 61 and the separator chamber 34, thus causing the valve 37 to open and drawing the cotton through the tube 35, into the compartment 34 and against the screen 40, while at the same time the valve 38 will be held closed under the action of the suction in the chamber. Upon continued movement of the lever 83, the stud or pin 79, in riding over the cam 80, will move the valve actuating lever 78 out of engagement with the stem of valve 66, permitting the latter to close automatically under the influence of spring 68. The other end of the lever 78 next comes into contact with the headed end of stem 74, thereby opening the valve 71 and establishing communication between the tubes 58 and 63, through the chamber 59, whereupon air under pressure will flow from the tube 63 through the tube 58 and act upon the piston 55 for moving rod 48 to close valve 49 and open valve 50. When the valve 50 opens, compressed air from the tower 27 will pass through the tubes 65 and 64 into the casing 39 and thence through tube 56 into compartment 34 at a point beneath the charge of cotton, for forcing the latter from the chamber 34 outward through tubes 57 and 32 into the cotton receiving dome 12, from which latter, it will fall by gravity, into the underlying receptacle 10. When pressure on the lever 83 is released, the spring 86 will return said lever to normal position and at the same time will act, through the rod 81, for carrying the lever 78 free of the valve stem 74, thus permitting the valve 71 to close under the action of spring 73. As soon as the stud has moved off the cam 80 lever 78 will be moved longitudinally under the impulse of the spring 78$^a$, for engaging its forked end with the valve stem 59, thus resetting the parts of the mechanism for repeating the operation just described.

It is to be particularly observed that in operation each of the nozzles 36 may be held and manipulated by one hand, thus providing for the attendant simultaneously operating a pair of the nozzles to gather material from the plants in two rows, and further that the lever 83 is arranged for movement by the hand which grasps the nozzle thus placing the valve controlling mechanism under convenient control of the attendant. Also it is to be especially noted that the cotton is automatically handled, in a continuous operation, from the time of taking it from the bolls until it is deposited in the storage receptacles, which is a very marked improvement over the cotton harvesting methods now in vogue. It is to be understood that, while I have herein shown and described a preferred embodiment of the invention and one which will operate effectively in the attainment of the ends in view, the invention is not restricted to the precise form of device herein disclosed, inasmuch as such changes as fall within the province of the skilled mechanic, may be resorted to without departing from the spirit or scope of the invention more particularly defined in the appended claims.

For example, the invention in its broader interpretation, comprehends the employment, where practicable, of other forms of vacuum and pressure devices, in lieu of the tanks and their accessories, for alternately creating a vacuum in and admitting a fluid under pressure to the separator compartment; the connection of the branch ducts 61 and 64 directly with the compartment 34, as distinguished from an indirect connection through the casing 39, and in that instance, the arrangement of the main controlling valves 49 and 50 directly in said ducts; and the provision of means, other than the auxiliary controlling valves 66 and 71 and their attendant mechanism, for alternately opening the main valves. These changes should, therefore, be read within the terms of the claims.

Having thus described my invention what I claim is:

1. In a cotton harvesting machine, a separator compartment, a picker duct leading thereto, a discharge duct leading therefrom, a vacuum device, a fluid pressure device, and means for alternately establishing communication between said compartment and devices for drawing a charge through the picker duct and expelling it through the discharge duct.

2. In a cotton harvesting machine, a separator compartment, a picker duct leading thereto, a discharge duct leading therefrom, a vacuum reservoir and a fluid pressure reservoir operatively connected with said compartment, and means for alternately establishing communication between said compartment and reservoirs for drawing a charge through the picker duct and expelling it through the discharge duct.

3. In a cotton harvesting machine, a separator compartment, a picker duct leading thereto, a discharge duct leading therefrom, a vacuum device, a fluid pressure device, means for alternately establishing communication between said compartment and devices for drawing a charge through the picker duct and expelling it through the discharge duct, and a controlling member carried adjacent the receiving end of the picker duct for operating said means.

4. In a cotton harvesting machine, a separator compartment having an inlet and a discharge port, a pair of tanks or reservoirs operatively connected with said compartment, means for exhausting fluid from one of said tanks and compressing it in the other, and means for alternately establishing communication between said tanks and the compartment.

5. In a cotton harvesting machine, a separator compartment having valve controlled inlet and discharge ports, ducts leading respectively to and from said ports, a vacuum device, a fluid pressure device, and means for alternately establishing communication between the compartment and said devices for drawing a charge through the inlet duct and expelling it through the discharge duct.

6. In a cotton harvesting machine, a separator compartment, a picker duct leading thereto and having a picker nozzle, a discharge duct leading from the compartment, a vacuum device, a fluid pressure device, means for alternately establishing communication between the compartment and said devices, and a controlling lever carried by the nozzle and connected for governing the operation of said means.

7. In a cotton harvesting machine, a separator compartment, a picker duct leading thereto and having a nozzle, a discharge duct leading from the compartment, a main valve chamber communicating with the compartment, vacuum and fluid pressure devices connected with said chamber, valves arranged in the chamber, means including a piston for operating said valves to alternately establish communication between the compartment and said devices through the valve chamber, an auxiliary valve chamber provided on the nozzle, a controlling duct leading from the main to the auxiliary chamber, vacuum and pressure ducts leading from the vacuum and fluid pressure devices to the auxiliary chamber, valves in said chamber for controlling communication between the vacuum and pressure ducts and the controlling duct, and means on the nozzle for alternately opening said controlling valves for establishing a vacuum or pressure in the main chamber to actuate the valve operating piston.

8. In a cotton harvesting machine, a separator compartment having a discharge port, a picker duct leading to the compartment, a main valve chamber sustained adjacent the latter, vacuum and fluid pressure devices communicative with the compartment through said chamber, valves in the chamber for controlling communication between said devices and the compartment, means for opening said valves alternately, and a controlling member carried by the duct for actuating said means.

9. In a cotton harvesting machine, a separator compartment having a discharge port, a picker duct connected with the compartment, a vacuum tank, a fluid pressure tank, vacuum and pressure ducts leading respectively from the tank to the compartment, valves arranged for controlling communication between the latter and ducts, means for opening said valves alternately, and a controlling member carried by the picker duct for actuating said means.

10. In a cotton harvesting machine, a separator compartment having an inlet and a discharge port, vacuum and fluid pressure ducts communicative with the compartment, means for exhausting one of said ducts and supplying fluid pressure to the other, main controlling valves for said ducts provided with a piston, means including vacuum and pressure ducts leading to and for actuating the piston to alternately open the main valves, auxiliary controlling valves for the last named ducts, and means for operating the auxiliary valves.

11. In a cotton harvesting machine, a separator compartment having inlet and discharge ports, means, including main fluid operated controlling valves, for alternately creating a vacuum in, and admitting a fluid under pressure to, said compartment, ducts connected with the main valves for supplying the operating fluid thereto, auxiliary controlling valves for the ducts, and means, under control of the operator, for actuating the auxiliary valves.

In testimony whereof I affix my signature, in presence of two witnesses.

HARRY A. BABBITT.

Witnesses:
F. W. PARKER,
S. R. RAYMOND.